E. THOMSON.
COOLING SPOT WELDING ELECTRODE.
APPLICATION FILED MAY 29, 1917.
1,256,951.
Patented Feb. 19, 1918.
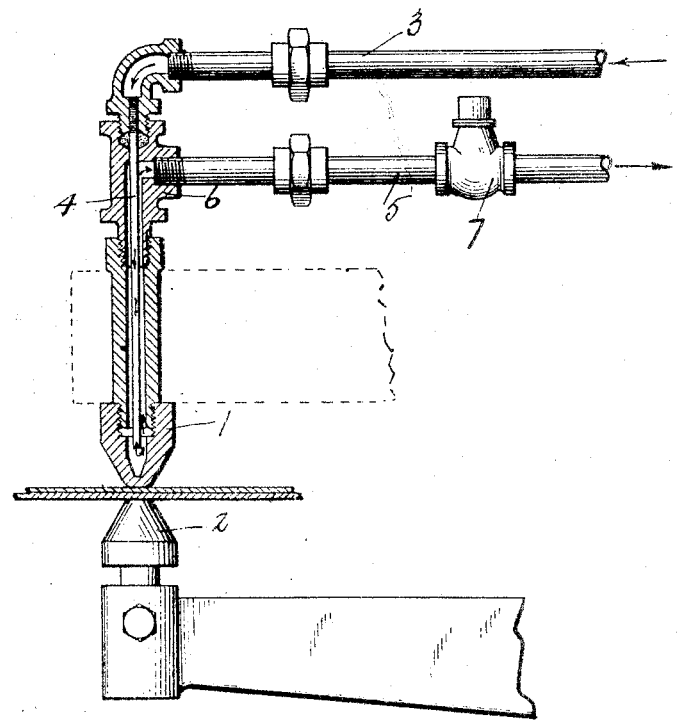
Inventor
Elihu Thomson
By his Attorneys
Townsend & Decker

UNITED STATES PATENT OFFICE.

ELIHU THOMSON, OF SWAMPSCOTT, MASSACHUSETTS, ASSIGNOR TO THOMSON SPOT WELDER COMPANY, OF BOSTON, MASSACHUSETTS, A CORPORATION OF MASSACHUSETTS.

COOLING SPOT-WELDING ELECTRODE.

1,256,951.   Specification of Letters Patent.   Patented Feb. 19, 1918.

Application filed May 29, 1917. Serial No. 171,634.

*To all whom it may concern:*

Be it known that I, ELIHU THOMSON, a citizen of the United States, and a resident of Swampscott, in the county of Essex and State of Massachusetts, have invented certain new and useful Improvements in Cooling Spot-Welding Electrodes, of which the following is a specification.

My invention relates to the manner of cooling electrodes of that class of electric welding machines in which the electrode, owing to the fact that it is in direct contact with the portion of work being welded, is liable to become unduly heated so that it is necessary or desirable to provide some means for artificially cooling said electrode. The necessity for a provision of this character is experienced particularly with the electrodes of spot welders and for this reason it has been heretofore proposed to circulate a cooling liquid such as water through the electrode. If water is circulated under ordinary conditions it may, by the sudden or extreme heating of the end of the electrode near the work, be thrown into spheroidal state and fail to carry off the heat properly. This is particularly true even with copper electrodes when they are employed for large and heavy work.

The object of my invention is to overcome this difficulty in the case of electrodes of copper and also to permit the use of material stiffer and harder than copper for the electrode by providing efficient cooling therefor even though the same may become heated to a very high temperature.

By the use of my invention a nickel electrode may be used.

Essentially my invention consists in circulating through the electrode a liquid, like water, restricting the flow thereof and maintaining a pressure of the liquid in the heated part of the electrode sufficient to prevent the liquid from being thrown into the spheroidal state by the excessive heat.

In practice I propose to keep the liquid at a high pressure of several hundred pounds or even as high as one thousand pounds to the square inch. To accomplish this it may be pumped into the electrode at the desired pressure and permitted to escape through a safety valve set to maintain that pressure. In this case the liquid could not enter into the spheroidal state even at a very high temperature of the electrode.

The pressure required would necessarily vary with the conditions. At ordinary atmospheric pressure it is well known that the spheroidal state will occur at something near 350°, that is, the water contact with a metal surface heated to that temperature breaks and even at pressures considerably above the atmospheric pressure, such as may occur when the attempt is made to keep the temperature down by supplying the liquid and simply circulating it in sufficient volume to carry off the heat, the spheroidal state will occur and defeat the object of efficient cooling when the metal reaches the very high temperatures which are liable to be produced in electric welding electrodes during use.

In my invention I do not depend upon rapidity of the flow of the liquid but on the contrary aim to restrict the flow for economy's sake and secure the desired result of efficient cooling by insuring contact of the liquid with the metal surfaces by maintaining a pressure well above that at which the liquid could be thrown into the spheriodal state under any of the temperatures to which the electrode may be subjected and this pressure I call super-pressure.

Plainly, so far as the structure of the electrode itself goes, my invention is capable of application to any form thereof permitting the circulation of a liquid in hollow spaces thereof near the point of contact of the work.

As illustrating the application of my invention, I simply show in the drawings a form of apparatus wherein a small tube entering the electrode bearing on the work carries the liquid down to the contact end and the liquid escapes through a concentric space after being heated and is delivered through a safety valve set to maintain the desired high pressure. The liquid may escape as superheated water or be converted into steam or be a mixture of steam and water when it escapes.

In the accompanying drawings the figure is an elevation and partial section of the apparatus to which my invention is applied.

The circulation of liquid is shown as employed only in connection with the upper electrode 1 of the spot welder although, as will be readily understood, the circulation of the liquid might be continued through the electrode 2 if desired. 3 indicates a pipe connected with the source from which the water or similar liquid is supplied under the required pressure, said pipe being connected at the top of the structure with tube 4 opening at its lower end into the space within the electrode proper. 5 indicates a pipe connected with the spaces within the stem 6 to which the electrode 1 is attached, such spaces communicating with the space in the electrode 1 into which the pipe 4 delivers the liquid. 7 indicates any safety or pressure valve inserted in the outlet passages and adjusted as before stated to maintain the required pressure.

What I claim as my invention is:—

1. The improvement in cooling electrodes of electric welding machines by a cooling liquid, consisting in restricting the flow of the liquid and maintaining said liquid in contact with the surfaces to be cooled at a super-pressure to prevent the liquid from being thrown into the spheroidal state.

2. The herein described improvement in water cooling spot welding electrodes by circulating water through the spaces within the electrode proper, consisting in restricting the flow of the water and maintaining it at a super-pressure within the electrode so as to prevent it from being thrown into the spheroidal state.

Signed at Lynn in the county of Essex and State of Massachusetts this 14th day of May A. D. 1917.

ELIHU THOMSON.

Witnesses:
F. B. TOWNSEND,
IRENE LEFKOWITZ.